Nov. 4, 1969 — N. H. LOVENDAHL — 3,475,983
PRECISION POSITION INDICATOR
Filed Nov. 9, 1967 — 2 Sheets-Sheet 1
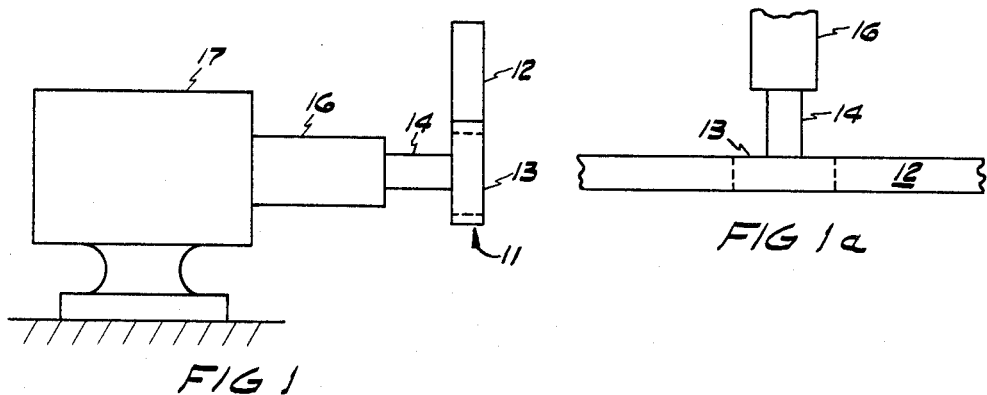
FIG 1
FIG 1a
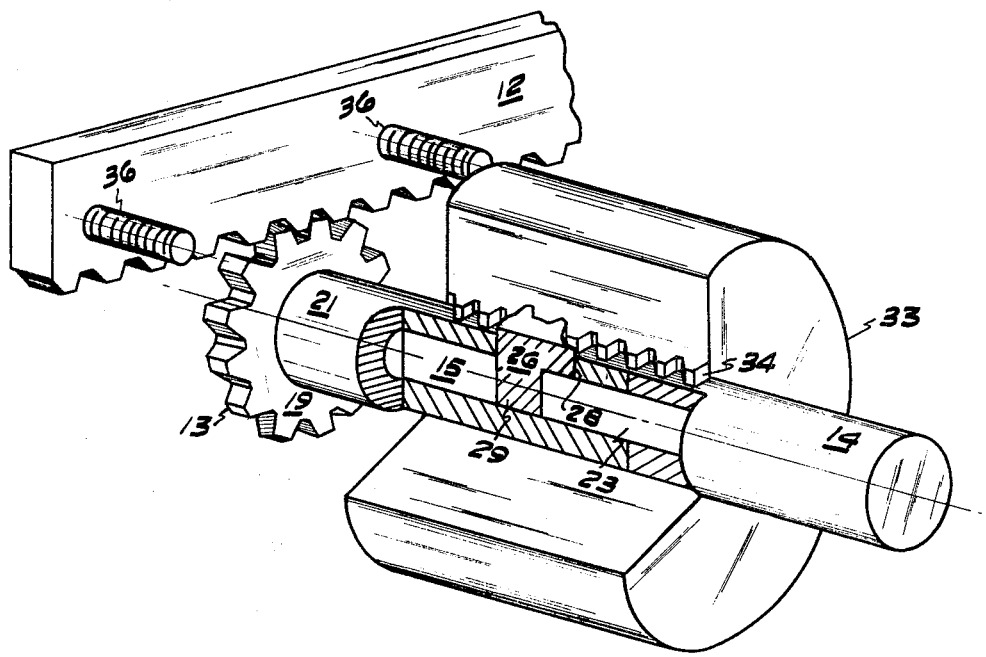
FIG 2
INVENTOR
N. H. LOVENDAHL
BY
Alter and Weiss
ATTORNEYS

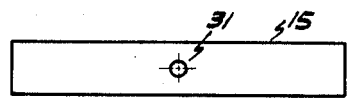
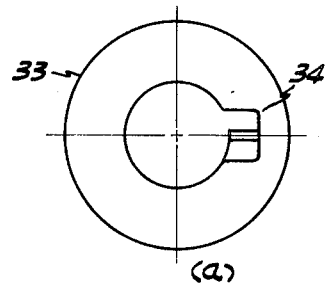
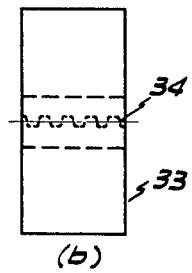
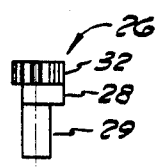
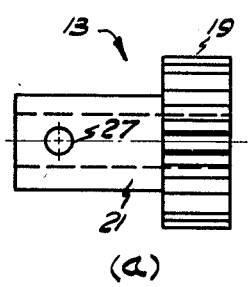
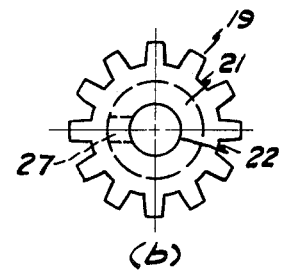
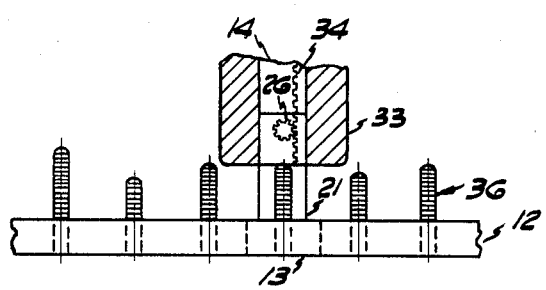
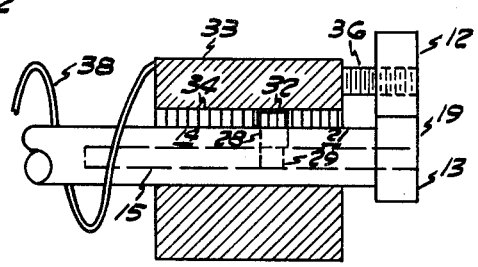
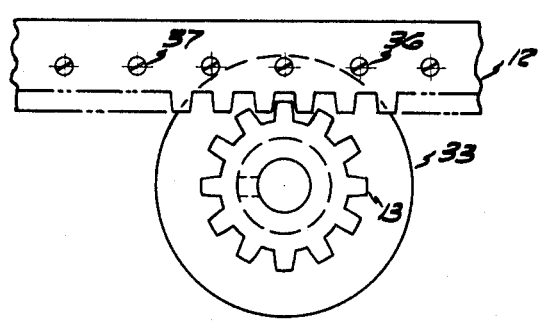

United States Patent Office 3,475,983
Patented Nov. 4, 1969

3,475,983
PRECISION POSITION INDICATOR
Norman H. Lovendahl, 814 Clinton Place,
River Forest, Ill. 60305
Filed Nov. 9, 1967, Ser. No. 681,630
Int. Cl. F16h 35/08
U.S. Cl. 74—395
12 Claims

ABSTRACT OF THE DISCLOSURE

A geared location indicator that is calibrated to correct for accumulated errors. The orientation of a driven gear is automatically varied with respect to an indicator shaft to compensate for the accumulated errors.

---

This invention relates to precision devices for measuring the relative displacement between two objects and is particularly concerned with precision indicators for use with machine tool position readouts.

The advances made in the automatic tool field have increased the need for greater precision. Automatic machine tools were originally used on the more prosaic jobs. However, as the machines were made more sophisticated the capability for using the machines for precision work increased and is continuing to increase. For all automated work within the capabilities of the precision equipment, the exact location of the actual machining components must be known at all times. The automatic machine's capability for precision is in fact almost directly related to the precision with which the machining components are located in $x$, $y$ and $z$ planes.

The location of the machine tool components must be also accurately known when the machines are manually operated. Location readouts are therefore used more extensively with the manually operated machines. The preciseness of the work is then a function of the accuracy of the readout.

Among the equipment used for locating the moving portions of the machine tools are a rack and pinion arrangement. The rack may be attached to the moving portion of the tool, as for example to the moving bed or table. Alternatively, the rack could be mounted on a stationary portion of the machine tool, such as the vertical standard, and the pinion could be mounted on a moving portion of the machine. The object, of course, is to obtain relative motion between the rack and the pinion. The pinion gear driven by the rack is attached to the shaft of a transducer. The transducer generates an electrical signal, as the shaft rotates, that is a direct function of the relative location of the machine tool part and is used to generate the readout of the location.

The presently known gear drive rack and pinion arrangements are excellent for the more prosaic jobs; however, these arrangements have proven far too inaccurate for the more sophisticated precision work. Among the problems encountered by the presently available equipment are the inaccuracies inherent in the gear drive and the inaccuracies in the total position indicating apparatus. These inaccuracies are practically impossible to remove. For example, the gears, such as the rack and pinion assembly, are manufactured within certain tolerances and these tolerances tend to accumulate and destroy the precision of the end product.

An object of this invention is to provide a compensated, gear-driven, machine tool position readout.

A related object of this invention is to provide a pinion-driven shaft that automatically adjusts the relative position of the input or pinion attached portion of the shaft to the output portion of the shaft.

Yet a further object of the invention is to provide a gear-driven position locating system that is calibrated to compensate for any and all errors between the actual location input and the signal representing the location. Thus, the inventive position locating system enables automatic machined tools to actually automatically produce parts that are machined to high precision tolerances.

In accordance with a preferred embodiment of my invention, the gear drive comprises a rack mounted to the device whose position is to be accurately located. The rack drives a pinion gear as the rack moves back and forth. The pinion gear has a gear collar that slip fits over a center shaft. The center shaft in turn is press fitted into a transducer shaft. Thus, the pinion gear can rotate about the center shaft while the transducer shaft is locked in with the center shaft. The transducer may be any transducer well known to those skilled in the art for producing an electrical signal responsive to and as a function of positional changes.

A sensing collar is slip fitted over both the gear collar and the transducer shaft, which are of the same outer diameter. The sensing collar has a longitudinal gear section along the periphery of its inner circumference. A geared eccentric pin meshes with and is driven by the longitudinal inner peripheral gear of the sensing collar gear. The pin, when positioned, extends through apertures in the pinion gear collar and in the center shaft. When the eccentric pin is rotated by the longitudinal movement of the sensing collar along the encircled pinion gear collar and transducer shaft, the pinion gear is caused to rotate about the center shaft in either a clockwise or counterclockwise direction relative to the center shaft and hence relative to the transducer shaft.

The rack is provided with means for longitudinally moving the sensing collar, such as, for example, adjustable studs. The sensing collar is spring loaded to force it to abut the adjustable studs as the rack moves.

Using calibrating blocks, for example, the adjustable studs are positioned to assure that the transducer output compensates for inherent errors and really reflects the precise position of the rack. The calibration effectively cancels all errors between position input at the rack and the output of the transducer.

Other and further objects and features of my invention will become more apparent as the description proceeds when taken in conjunction with the drawings, in which:

FIGURE 1 illustrates a side view representation of presently used gear-driven position indicators;

FIGURE 1a is a top view of tthe position indicator of FIG. 1;

FIGURE 2 is a partial sectional pictorial view of the inventive pinion gear and transducer shaft arrangement;

FIGURE 3 is a front view of the rack and pinion arrangement of the illustrated inventive position indicator;

FIGURE 4 is a plan view of the rack and pinion arrangement, including a sectional view of the pinion gear and transducer shaft arrangement;

FIGURE 5 is a side view of the arrangement of FIG. 4;

FIGURE 6 is a top view of the center shaft used in coupling the pinion gear to the transducer shaft;

FIGURE 7 is a side view of an eccentric pin used in joining the pinion gear to the center shaft;

FIGURE 8 is a side view of the pinion gear, and

FIGURE 9 illustrates the sensing collar in views (a) and (b).

The system shown in FIGS. 1 and 1a is a well-known position indicator that comprises gear drive means 11. The drive means normally used, as shown in the rack 12 and the cooperatively matching pinion gear 13. The rack is mounted to the device whose position is being monitored.

The movement of the device (not shown) moves the rack 12 and actuates the movement of pinion gear 13. The movement of pinion gear 13 causes shaft 14 to rotate therewith. The rotation of shaft 14 operates transducer 16 which may be any well-known type of transducer. In one well-known system the transducer is an integral part of a pulse generator, for example. The transducer 16 translates the mechanical motion of shaft 14 into an electrical signal. The electrical signal is used, for example, to control the position of the device in accordance with a control signal, or to provide a visible readout. The control unit 17 is used, for example, to translate the transducer signal to indicate the position of the device in question, either as a feed back signal or as a visible readout. The control unit 17 may be a pulse generator if a digital control system is used or it may be a servomotor if an analog control system is used. The control unit 17 could also be the actual readout position indicator.

FIGURE 2 shows an embodiment of the inventive improvement of the position indicator shown in FIGS. 1 and 1a. The system of FIGS. 1 and 1a is deficient in that the accuracy of the system is dependent, among other things, on the manufacturing tolerances of the gear assembly as well as the tolerances in the transducer. The system of FIG. 2 teaches a means for calibrating the system to compensate for the noted tolerances. The calibration, once accomplished, for all practical purposes, forever compensates for any and all manufacturing tolerances and errors in the gear train.

In greater detail, means are provided for changing the relative fixed position between the pinion gear 13 and the transducer shaft 14. The change is made to compensate for the manufacturing errors in the gear train so that the transducer shaft is actually rotated through the same arc that would exist if no error existed. FIG. 2 best illustrates how the compensation is accomplished. As shown in FIG. 2 and in the details of FIG. 8, the pinion gear 13 has a main body section 19 and a gear collar 21 extending coaxially and normally therefrom. The gear further has longitudinal aperture 22 therethrough for receiving a center shaft 15. The gear 13 is slip fitted on center shaft 15 which is shown in detail in FIG. 6. The transducer shaft 14 also contains cylindrical recess 23 for receiving the center shaft 15. Recess 23, however, is dimensioned so that shaft 15 press fits therein so that any movement of shaft 15 is followed simultaneously by movement of shaft 14.

Means such as eccentric pin 26 are provided for varying the position of pinion 13 relative to transducer shaft 14. Thus, depending on whether pin 26 rotates clockwise or counterclockwise, pinion gear 13 is advanced or retarded relative to center shaft 15 and consequently to transducer shaft 14.

In the embodiment shown in the drawings and as particularly illustrated in FIG. 2, the eccentric pin 26 passes through hole 27 in the collar 21 of pinion gear gear 13. The lobe or eccentric portion 28 of pin 26 abuts the inner walls of hole 27 in collar 21. The concentric portion 29 of pin 26 abuts the walls of hole 31 (FIG. 6) in center shaft 15. The concentric portion of eccentric pin 26 acts as a fulcrum so that the eccentric pin 26 rotates about the concentric portion thereof and the eccentric portion of the pin causes the pinion gear to advance or rotates so that the relative position of the gear 13 and shafts 15 and 14 is changed when the eccentric pin 26 is rotated. The pinion gear, it should be noted, may be shifted longitudinally as well as rotationally; however, the longitudinal movement would be insufficient to adversely effect the cooperative meshing of rack 12 and gear 13.

The eccentric pin 26 is provided with a geared head 32. The geared head 32 serves to drive the pin to change the relative position of the pinion gear 13 and the shaft 15. Since the center shaft 15 is press fitted into transducer shaft 14, when the pinion gear 13 changes position relative to center shaft 15 it also changes position relative to the transducer shaft 14. The center shaft 15 is slip fitted into the pinion gear collar 21 and accordingly the pinion gear is free to move relative to the center shaft 15 under the control of the eccentric pin 26.

Means are provided for causing the eccentric pin 26 to rotate, whereby errors in the rack and pinion gear arrangement can be automatically corrected. More particularly, sensing collar 33 (FIG. 9) is provided with a cylindrical aperture dimensioned to slip fit around both collar 21 and shaft 14. The collar 33 is provided with rack gear 34 longitudinally disposed contiguous to the collar 21 and shaft 14. The longitudinally disposed gear 34 cooperates with the gear teeth of gear head 32 to actuate clockwise or counterclockwise movement of the eccentric pin 26 and commensurate movement of pinion gear 13 relative to transducer shaft 14.

Calibrating means such as studs 36 are provided for causing the sensing collar 33 to move longitudinally back and forth as required along gear collar 21 and shaft 14. The sensing collar 33 abuts the ends of the studs 36 as the pinion gear 13 and the rack 12 move relative to each other. The sensing collar is thus forced to move backward, forward, or remain stationary, depending on the distance between the rack 12 and the end of the individual studs 36 as the sensing collar 33 is juxtaposed to the individual studs 36. The lengths of the studs may be individually adjusted in any well-known manner such as by threading them into and out of the rack as required. The studs 36 are then locked in position in any well-known manner.

It should be understood that the studs 36 are shown only by way of example. Actually, a cammed surface could also be used. Further, as best illustarted in FIGS. 3 and 4, the studs 36 are placed so that the collar is always located by only a single stud at some relative position of the rack and pinion. Similarly, the sensing collar 33 always abuts at least one stud.

The studs 36 may be slotted with slots such as slot 37 to facilitate adjusting the lengths of protrusion of the individual studs. Similarly, any other well-known means, such as flats on the surface of the studs 36 may be used to facilitate the adjustment of the studs.

Means such as spring 38 are proivded for assuring that the sensing collar 33 is maintained contiguous to the ends of the studs 36. A simple helical spring is illustrated in FIG. 5 for exemplary purposes only.

In practice, calibrating blocks are used to adjust the distance each of the studs 36 protrude. That is, the rack is moved a fixed distance, which is substantiated or determined by using a calibrating block. The appropriate stud 36 is adjusted to move the sensing collar 33 a sufficient amount to cause the transduced output to indicate the distance actually moved by the rack. Each tooth of the gear arrangement may be so calibrated; or at the required increment, the appropriate stud 36 is properly adjusted and locked in the adjusted position. Then as the rack 12 moves with the machine, the pinion gear 13 moves cooperatively. However, shaft 14 is moved responsive to the movement of both the pinion gear and eccentric pin 26 so that the movement of shaft 14 is automatically corrected to account for errors such as those inherent in gear-driven device 11.

In one examplary embodiment of the invention the following parts were used:

Rack _____ 1/10 pitch, Pic. Cat. No. AG-32-P3.
Pinion gear ___ 1/10 pitch, Pic. Cat. No. 31.
Center shaft __ 3/16 inch dia.
Eccentric pin __ Concentric 3/32 inch, eccentric 0.0010 inch, 90 pitch concentric.
Spring 38 ____ Music wire.

While the principles of the invention have been described above in connection with specific apparatus, it is to be clearly understood that this description is made only by way of example and not as a limitation on the scope of the invention.

I claim:

1. A position indicator for providing an indication of the relative movement between two devices,
    said indicator comprising a transducer for converting the mechanical motion into indicating signals,
    mechanical motion means oriented to provide the mechanical motion responsive to said relative movement,
    said mechanical motion means comprising a first portion fixed to one of said two devices and a second portion attached to the other of said two devices,
    said second portion being contiguous to said first portion whereby said second portion moves responsive to movement of said first portion,
    connecting means for connecting said second portion to said transducer, and
    orientation variation means for varying the orientation of said second portion to correct errors in said indication to assure that said indication is of the actual relative movement between the two devices.

2. The position indicator of claim 1 wherein said mechanical motion providing means comprises a rack and pinion arrangement.

3. The position indicator of claim 2 wherein said first portion includes said rack, wherein said second portion includes said pinion comprising pinion gear means cooperatively meshed with said rack,
    wherein said connecting means includes shaft means for coupling said pinion gear means to said transducer, and
    wherein said orientation varying means comprises collar means mounted on said shaft for changing the position of said pinion gear on said shaft means.

4. The position indicator of claim 3 wherein calibrated means are provided for actuating said collar means to longitudinally move said collar means,
    and pin means rotated responsive to said longitudinal movement for changing the position of said pinion gear on said shaft means.

5. The position indicator of claim 4 wherein said calibrated means comprises
    a plurality of studs mounted adjacent to said rack means for abutting said collar means,
    said studs having individually adjustable lengths to longitudinally move said collar means responsive to the different lengths.

6. The position indicator of claim 5 wherein said collar means comprises
    means for cooperatively coupling said collars means to said pin means, and
    means for mounting said pin means in said shaft in controlling contact with said pinion gear.

7. The position indicator of claim 6 wherein said means for cooperatively coupling said collar means to said pin comprises
    longitudinal gear means contiguous to said shaft means on the inner periphery of said collar means,
    and gear head means integral with said pin means cooperatively meshing with said longitudinal gear means to rotate said pin responsive to the longitudinal movement of said collar means.

8. The position indicator of claim 7 wherein said pin means comprises an eccentric pin,
    gear collar means integral to said pinion gear,
    first aperture means in said gear collar for receiving the eccentric portion of said eccentric pin, and
    second aperture means in said shaft for receiving the concentric lower portion of said eccentric pin,
    whereby said pinion gear is rotated about said shaft as said eccentric pin is rotated by said longitudinally moving collar.

9. The position indicator of claim 8 wherein said shaft means comprises a center shaft designed to slip fit into said gear collar and a transducer shaft,
    means for fixedly attaching said center shaft to said transducer shaft.

10. A position indicator for indicating the relative motion between a first and a second device,
    said indicator comprising readout means,
    shaft means having an input side and an output side,
    means for attaching the output side of said readout means,
    coupling means for coupling said input side to the first of said devices, while said shaft is rotatably attached to the second of said devices, and
    eccentric pin means included in said shaft means for varying the orientation of the coupling means relative to said shaft means to correct errors in said coupling means.

11. The position indicator of claim 10 wherein said coupling means comprises a rack attached to the first of said devices and a cooperative pinion gear attached to said input side of said shaft.

12. The position indicator of claim 11 wherein said pinion gear has a gear collar, means slip fitting said shaft into said collar, and
    wherein said eccentric pin means comprises longitudinally movable collar means surrounding said gear collar,
    said collar means having a longitudinal gear contiguous to said gear collar,
    eccentric pin mounted through said gear collar and into said shaft means,
    said eccentric pin having a gear head in cooperative association with said longitudinal gear,
    said eccentric portion of said pin actuating said pinion gear when said pin is rotated responsive to the movement of said collar,
    and calibrating means associated with said collar to move an amount sufficient to correct any errors in the rack and pinion gear arrangement.

References Cited

UNITED STATES PATENTS 2,511,956  6/1950  Wetzel _____ 74—388 X
3,241,389  3/1966  Brouwer _____ 74—388 X LEONARD H. GERIN, Primary Examiner U.S. Cl. X.R.
74—388, 409